B. D. KNICKERBOCKER.
BATH CABINET.
APPLICATION FILED SEPT. 3, 1910.

1,035,362.

Patented Aug. 13, 1912.
8 SHEETS—SHEET 1.

B. D. KNICKERBOCKER.
BATH CABINET.
APPLICATION FILED SEPT. 3, 1910.

1,035,362.

Patented Aug. 13, 1912.

B. D. KNICKERBOCKER.
BATH CABINET.
APPLICATION FILED SEPT. 3, 1910.

1,035,362.

Patented Aug. 13, 1912.
8 SHEETS—SHEET 4.

Witnesses:
Inventor:
Burton D. Knickerbocker,
By David H. Fletcher,
Atty.

B. D. KNICKERBOCKER.
BATH CABINET.
APPLICATION FILED SEPT. 3, 1910.

1,035,362.

Patented Aug. 13, 1912.
8 SHEETS—SHEET 7.

UNITED STATES PATENT OFFICE.

BURTON D. KNICKERBOCKER, OF CHICAGO, ILLINOIS.

BATH-CABINET.

1,035,362.

Specification of Letters Patent. Patented Aug. 13, 1912.

Application filed September 3, 1910. Serial No. 580,417.

*To all whom it may concern:*

Be it known that I, BURTON D. KNICKERBOCKER, a citizen of the United States, residing at Chicago, in the county of Cook and State of Illinois, have invented certain new and useful Improvements in Bath-Cabinets, of which the following is a description, reference being had to the accompanying drawings, forming a part of this specification, in which corresponding numerals of reference in the different figures indicate like parts.

The object of my invention is to provide a bath cabinet adaptable for use in small apartments or other places in which it is desirable to economize space, which cabinet shall be so constructed as to enable the principal features thereof to be compactly folded or unfolded in a manner to permit either to be utilized when desired with the same advantage as if they were immovable while at the same time the room in which they are placed may be used for other purposes.

A further object is to so construct said device as to enable it to be readily cleaned and maintained in a sanitary condition.

To these ends my invention consists in the combination of elements hereinafter more particularly described and definitely pointed out in the claims.

In the drawings: Fig. 8, Fig. 7, is a view similar to that represented in Fig. 5, but showing the walls as finally adjusted for use.

Figure 9:
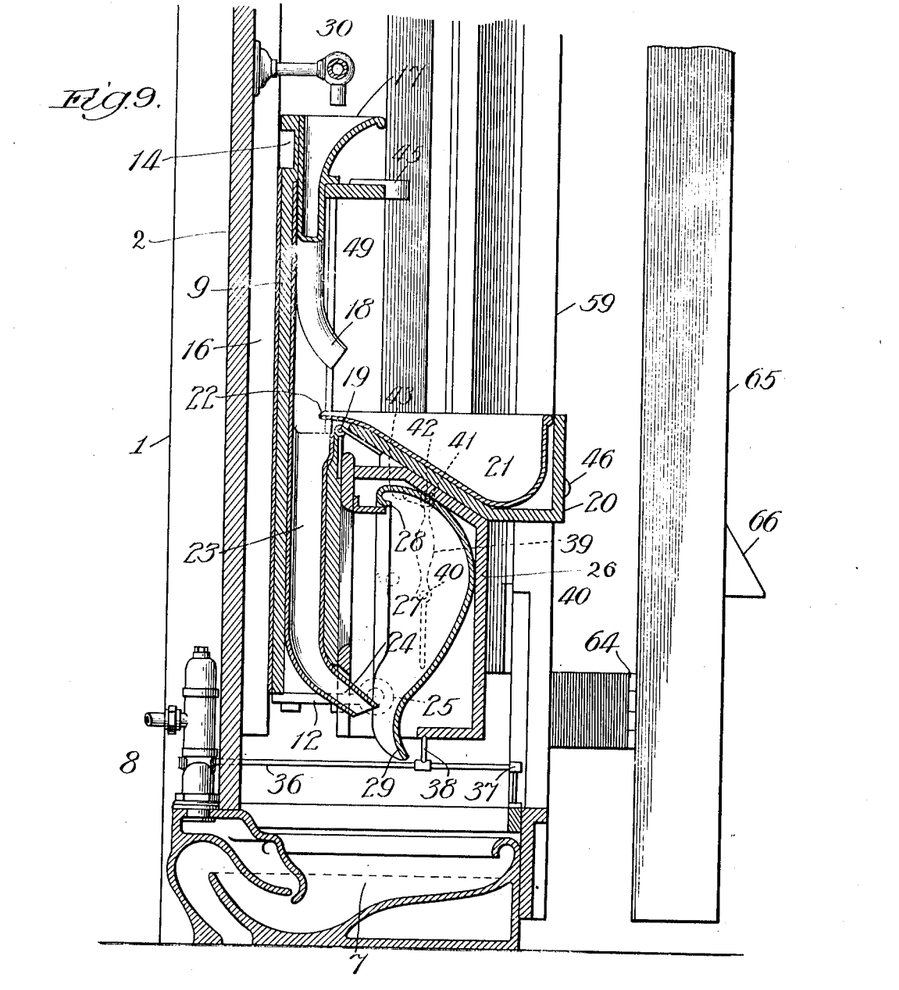
Fig. 9, is a like view showing the closet bowl folded and the lavatory bowl extended and ready for use.
Figure 10:
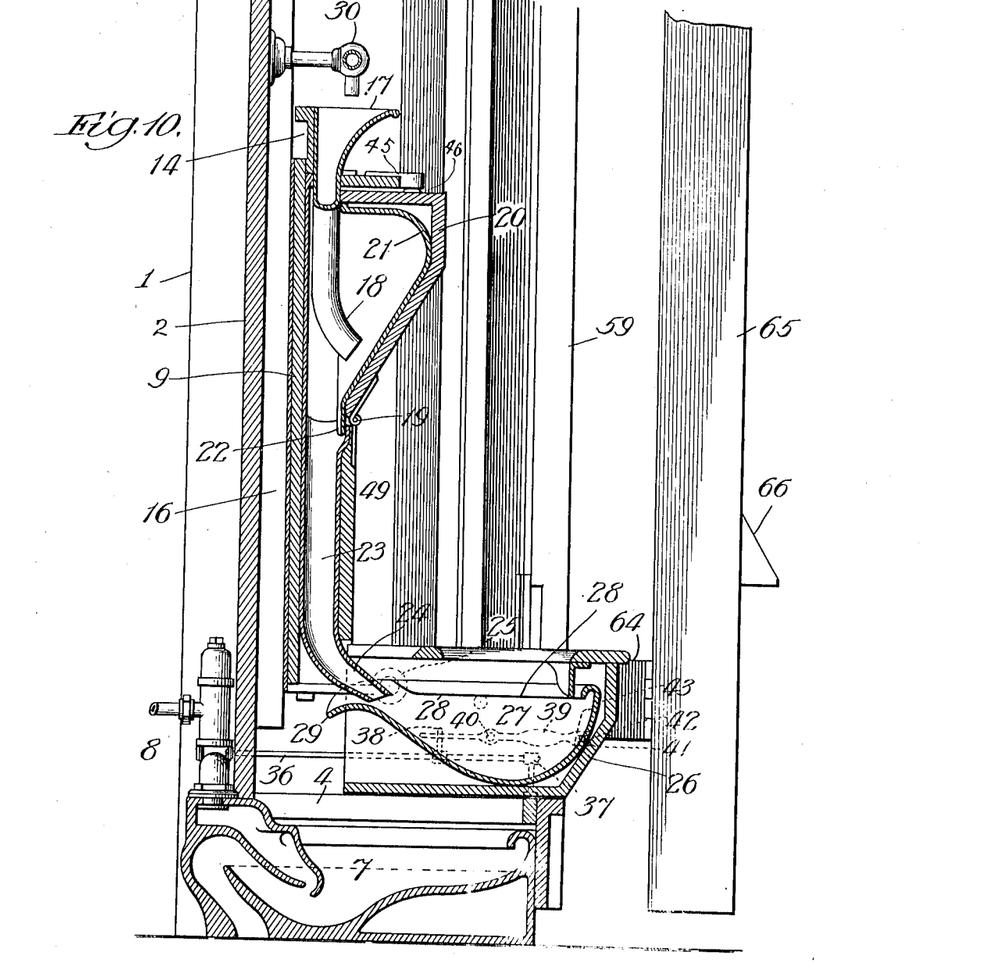
Fig. 10, is a like view showing the lavatory bowl folded and the other extended.
Figure 11:
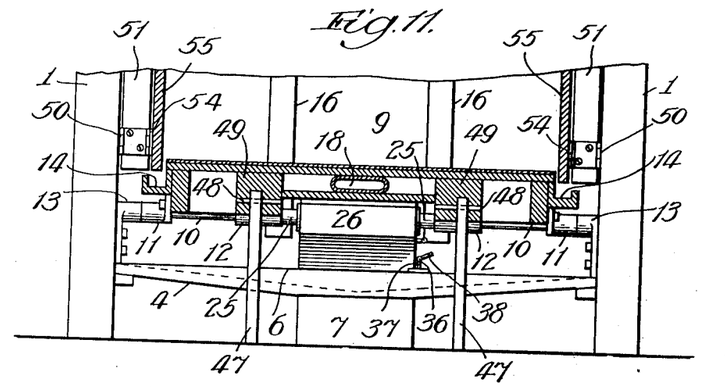
Fig. 11, is a vertical sectional view of the lower portion of the cabinet, said view being taken upon the line 11, Fig. 7, viewed in the direction of the arrow there shown

Referring to the drawings, 1 represents the main standards or stationary side members forming portions of the main frame of a cabinet, which parts are rigidly connected with a back wall 2, a top frame element 3 and a drain-board 4, which is rigidly attached to the inner faces thereof near the bottom as more clearly shown in Figs. 3, 6, 7, 8 and 11. Said drain-board is preferably formed from enameled sheet metal and is arranged to slope from the ends toward a central opening 5, at the middle, while vertical flanges 6, 6, Figs. 4 and 11, are provided at the front and rear edges respectively. The opening 5 is directly over and in communication with a flush-bowl, generally designated by 7, the outlet of which is in communication with a drain-pipe not shown, and a flush-valve 8. Figs. 4 to 7 and 8 to 10 inclusive, said bowl and valve being of well-known construction. A combined platform, lavatory and bowl support, generally indicated by 9, is pivotally mounted upon short horizontal shafts or trunnions 10, which are secured to the ends of metal hinge members 11 and 12 respectively, said members being rigidly attached to the rear edge of said platform at right angles to the plane of the latter, and are of a sufficient length to enable the pivotal point to be considerably forward of the plane of said platform when in a raised or normal position as clearly shown, for example, in Fig. 8, so that when raised, the center of gravity of the platform will be so disposed as to cause it to maintain its position. Said trunnions are supported in bearings 13 attached to the inner faces respectively of the frame member 1.

The upper surface of the platform, which is in the rear when in its normal position, is so shaped as shown in Fig. 4, as to slope laterally when in use from the middle outwardly to the edges so as to enable it to drain into a marginal gutter 14 which is extended along the front and sides of said platform, the side gutters being open at the rear ends so as to drain upon the drainboard 4 as hereinafter described. Spring catches 15, Figs. 3 and 4, are attached to the back 3 to engage with opposite edges of the platform and hold it firmly in place when raised to prevent accidental displacement.

The part which I have designated as the platform 9 is intended normally to stand in a vertical position as shown in Figs. 3, 8, 9 and 10, and to serve as a support for other elements as hereinafter stated. When so adjusted the back is adapted to rest against cleats 16, Figs. 4, 10 and 11, attached to the back 2, to form a space between said back and platform. Permanently attached to the front of the part 9 with its top flush with the upper edge of the platform is a funnel 17, Figs. 3 and 8 to 10 inclusive, having a downwardly extended tube the lower end of which is bent outwardly as shown at 18, said tube being preferably flattened in cross-section as shown in said last named figure. Hinged upon a horizontal axis to the front of said platform, as shown at 19, is a lavatory bowl which consists of an outer casing 20, provided with a lining 21 of enameled metal, porcelain or other suitable material forming the bowl proper. Said bowl is made deep at the forward part and shallow at the rear, being provided with a discharge portion 22, which is arranged to extend into a vertical conduit 23, the lower end of which is tapered and bent forward as shown at 24. Mounted upon a horizontal axis 25, shown in full lines in Figs. 3 and 11 in dotted lines on Figs. 8 to 10 inclusive, is a casing 26, within which is fitted a closet bowl 27, of porcelain or other suitable material, which corresponds in its general shape to that of the lavatory bowl 21, except that it is provided with a rounded inturned flange 28 upon its upper edge extending entirely around the bowl except at the discharge portion at the rear, which latter is made quite shallow and curved rearwardly and downwardly as shown at 29. The discharge spout 24 of the flushing conduit 23, is bent forwardly as stated, so that when the bowl 27 is in position shown in Fig. 10, water discharged therefrom may serve to enter said bowl with sufficient force to flow over the top but is prevented from so doing by the flange 28.

Figure 8:
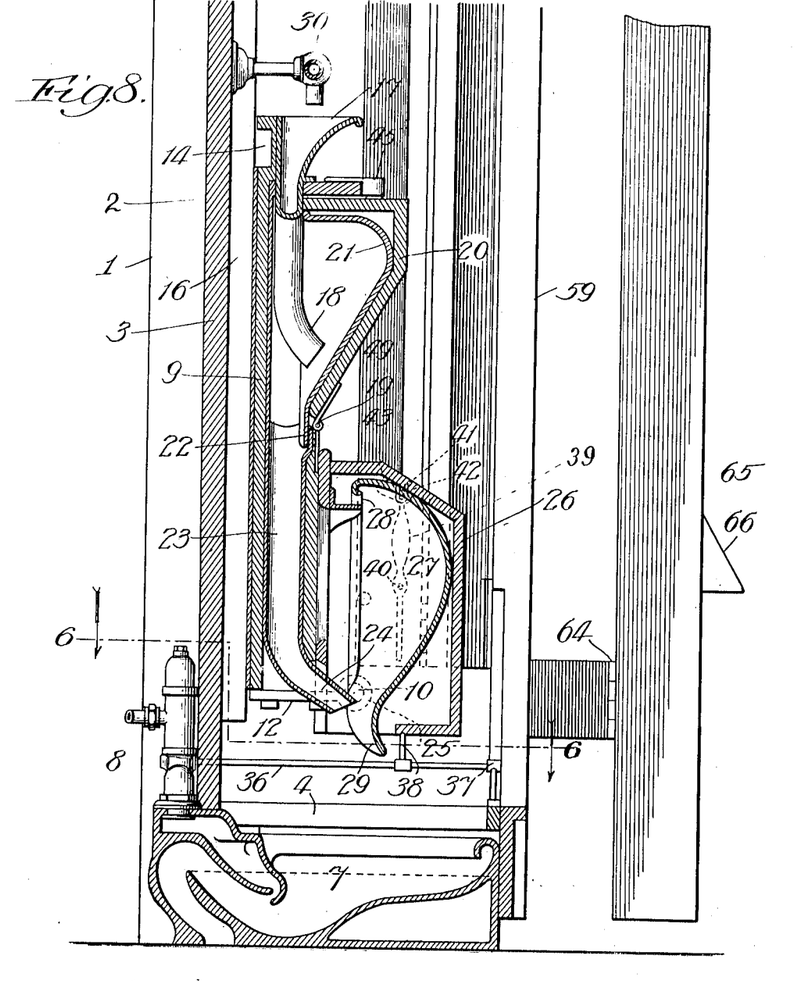
Fig. 8, is a vertical sectional view taken upon the line 8, Fig. 3, showing the bowls in their respective folded positions.

A faucet 30, connected with a source of water supply, is located directly above the funnel 17, so that water discharged therefrom will flow into said funnel and from thence through the spout 18 into the lavatory bowl 21. Assuming the latter to be in a folded or horizontal position, as shown in Fig. 9, the water, after rising nearly to the top, will overflow from the discharge 22 into the conduit 23 and thence into the final discharge bowl 7. Upon tilting the lavatory bowl 21 into the position shown in Fig. 8, the contents will also be discharged in the same manner.

Figure 2:
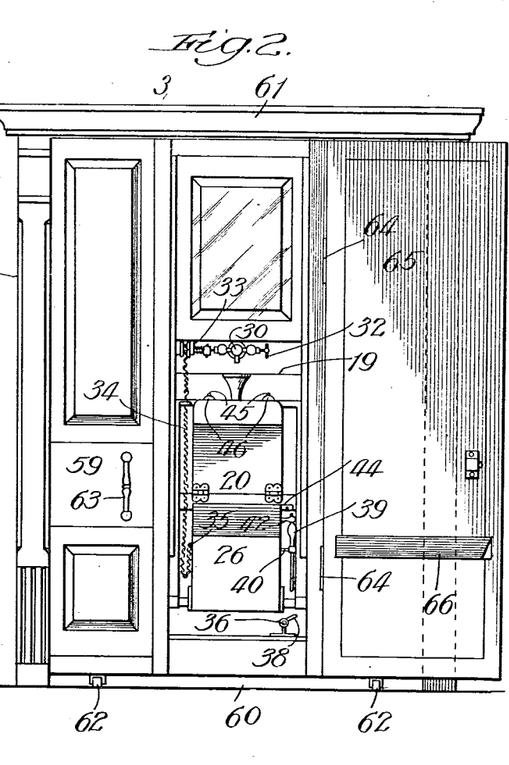
Fig. 2, is a like elevation representing the same with the door open.
Figure 3:
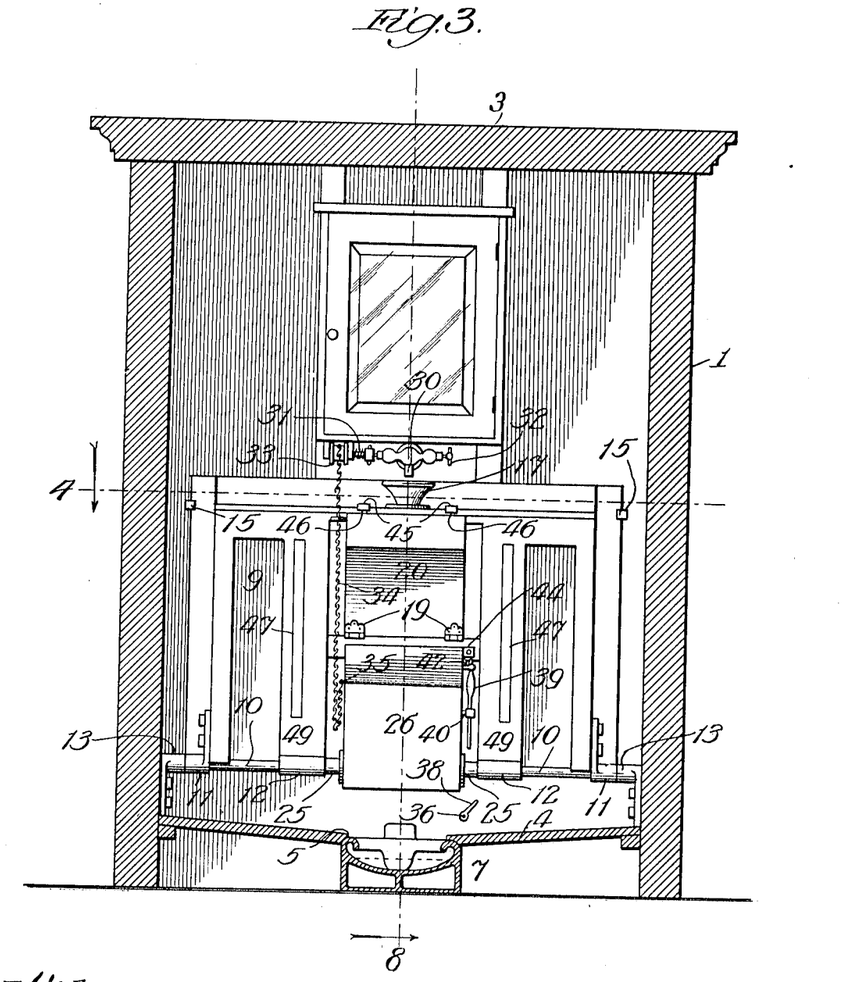
Fig. 3, is a transverse vertical sectional view taken upon the line 3, Fig. 6, viewed in the direction of the arrow there shown.
Figure 4:
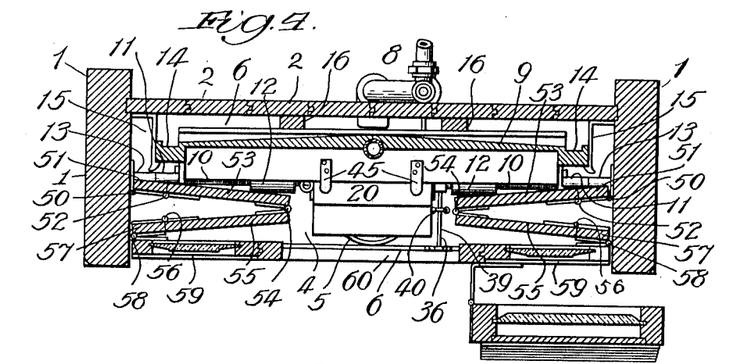
Fig. 4, is a sectional view in plan, taken upon the line 4, Fig. 3, showing the walls of the cabinet folded and the door open.
Figure 5:
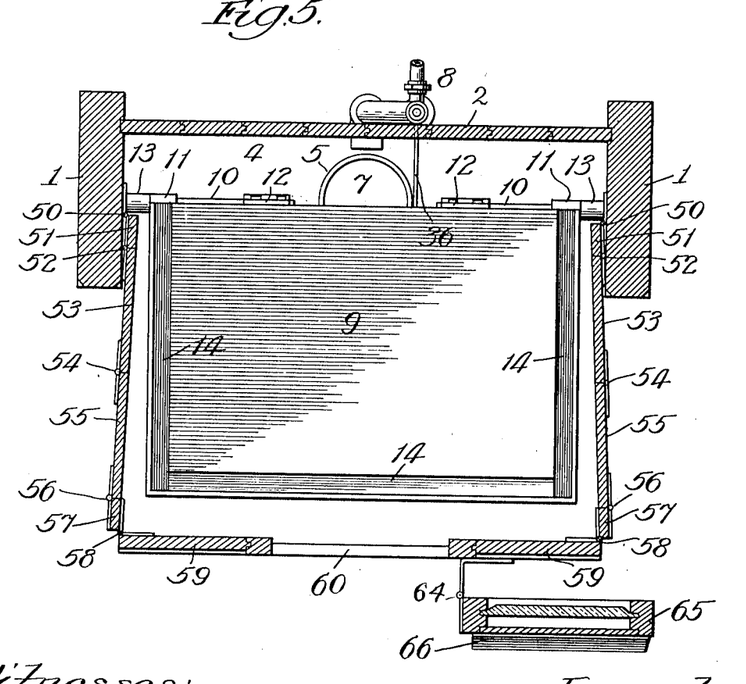
Fig. 5, is a like view showing the platform lowered and the cabinet walls extended to permit such lowering action but not in the final position for use.
Figure 6:
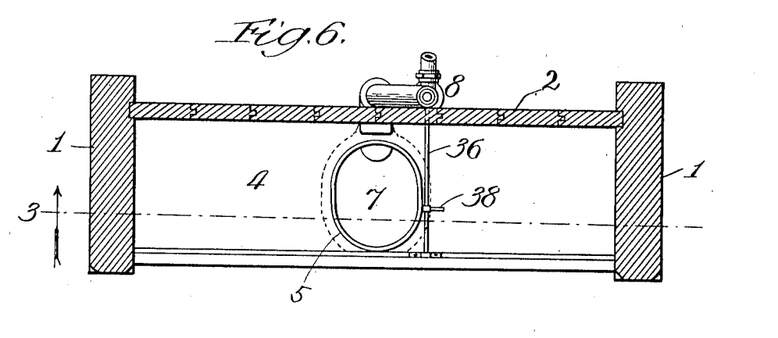
Fig. 6, is a transverse sectional view in plan taken upon line 6—6.

The faucet 30 is of a well known construction and is adapted to be normally closed by means of a spring 31, Fig. 3. It is preferably opened for lavatory use by means of the handle 32 but when it becomes desirable to flush the bowl 27, I prefer to employ the following described mechanism: A pulley 33, is rigidly attached to an extended portion of the spring-controlled valve stem, to which pulley is secured, a chain 34, the lower end of which is attached to the casing 26 of the bowl 27, as shown at 35, Figs. 2 and 3. If adjusted to the proper length it will cause the faucet to be opened thereby when the bowl is lowered to its full limit as shown in Fig. 10, or the chain may be pulled by hand.

It is desirable to have the bowl 7 flushed simultaneously with the discharge of the bowl 27, which may be accomplished as follows: A valve-rod 36 is extended forwardly from the flush-valve 8 to a bearing 37, adjacent to the forward end of the bowl, said bearing being supported upon the front edge of the drip-board 4. The flush-valve which is actuated by said rod, is held normally closed by means of a spring in the usual way. A laterally extended arm 38, located at the side of the casing 26, is rigidly attached to the rod 36. A hand-lever 39, Figs. 2, 3, 4 and 8 to 10 inclusive, is pivotally mounted upon a stud 40, attached to the side of the casing 26, while its forward end is bifurcated as shown at 41, to straddle a pin 42, which is rigidly attached to the bowl 27 and extended through a slot 43, in the side wall of the casing 26.

When the bowl is in the position shown in Fig. 10 the rear end of the hand lever 39 is caused to rest above and in contact with the arm 38 so that when the forward end of said lever is lifted, the consequent depression of the rear end will act to tilt the arm 38 and open the flush-valve 8 to flush the bowl 7.

The bowl 27 and casing 26, while pivoted upon the same axis, are free to be moved for a limited distance independently of each other, which movement is permitted by the slot 43. It will be seen that the movement for discharging the bowl 27 is simultaneous with that which opens the flush-valve. A continued lifting upon the lever 39 serves to restore the case 26 to its normal position where it may be locked in place by means of a spring catch 44, Figs. 2 and 3, or by other suitable means. The casing 20 may also be secured in a vertical position by means of spring catches 45, upon the front of the part 9, Figs. 2, 3, 8 and 9 adapted to engage knobs 46 upon said casing.

Figure 12:
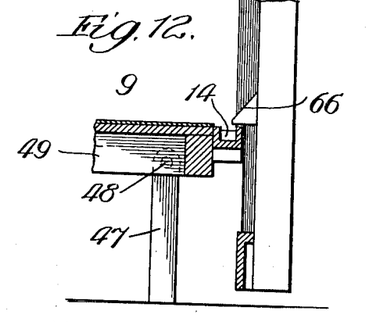
Fig. 12, is a vertical sectional view in detail taken upon the line 12, Fig. 7, viewed in the direction indicated by the arrow.

The cabinet may be utilized for the purpose of bathing by merely releasing the catches 15, Fig. 4, and lowering the platform 9 to a horizontal position in which it is supported preferably by means of gravity legs 47, Figs. 3, 11, and 12, which are pivoted at 48 in suitable recesses formed in the strengthening ribs 49 upon the front of said platform. It is obvious that before lowering the platform the two bowls should be folded and locked against it, as shown in Fig. 8, so that they may lie beneath the same when so lowered in the manner shown in Fig. 11. The lowering of the platform permits the legs 47 to swing into vertical positions respectively, as clearly shown in Figs. 11 and 12.

Figure 1:
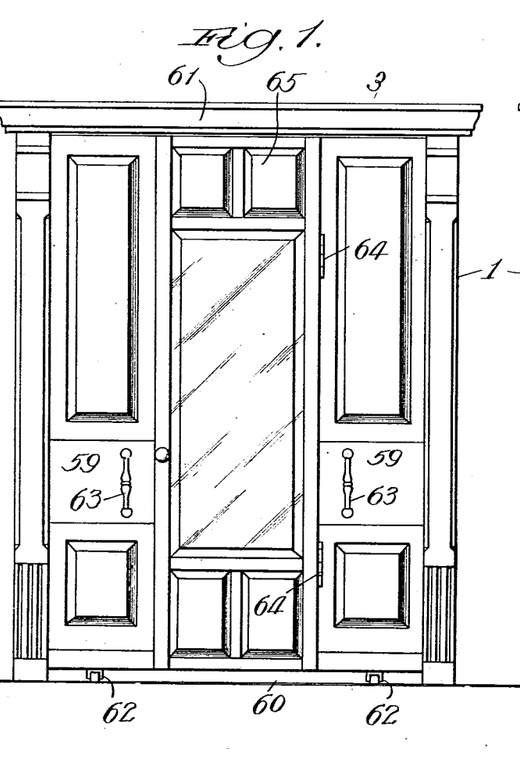
Figure 1, is a front elevation of my improved cabinet as it would appear when closed.
Figure 7:
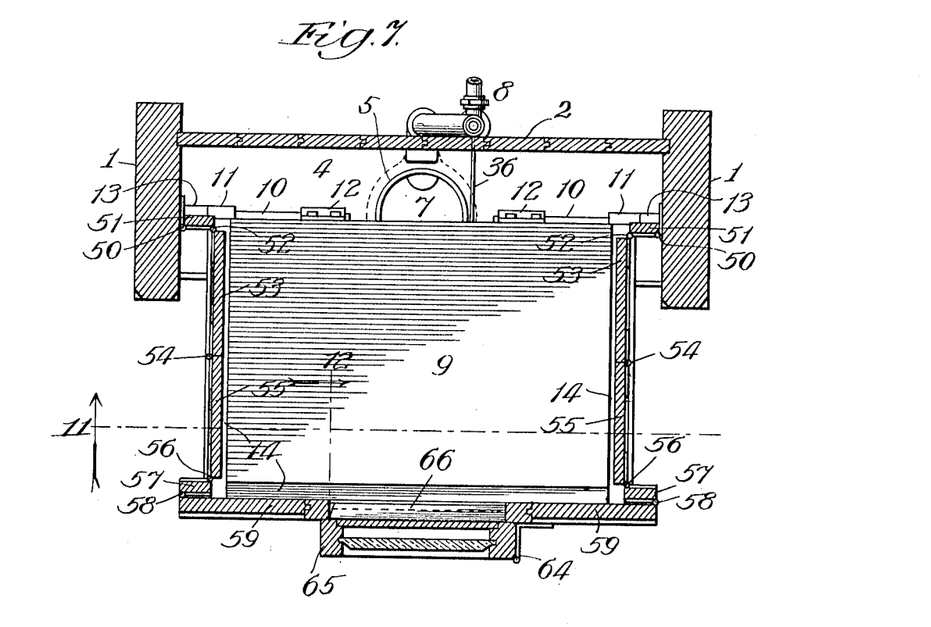

While I have contemplated the use of a folding case for said device when used as a bath cabinet, I do not wish to be confined thereto, as it is manifest that the platform and other parts may be used with a mere curtain, or in an ordinary room without any other inclosure. I have, however, shown what I regard as a preferred form of inclosure which is adapted to be compactly folded with the other parts and which will now be described. Hinged at 50, Figs. 4, 5, 7 and 11, to the inner faces of the upright supports 1, are vertical members 51, to which in turn are hinged at 52, panels 53. To the panels 53 are hinged at 54, like panels 55. To these in turn, are hinged at 56, narrow vertical members 57, which are attached by means of hinged connections 58 to panels 59, the latter constituting the main portion of the front of the cabinet. The members or panels 59 are connected together at the bottom and top respectively, by means of a bar 60 and a cornice member 61, Figs. 1, 2, 4, and 5. The front is provided with casters 62, Figs. 1 and 2, which serve in conjunction with the hinges described to support the same. Handles 63 are provided upon the panels 59 to enable the front to be moved forward or back as desired. Hinged at 64 to one of the front panels, is a door 65 which is preferably provided with a beveled cleat 66 upon its inner face which is adapted to overhang the trough 14 when the platform is lowered and the door closed, for the purpose of deflecting dripping water which may be splashed against the door, into said trough. As will be seen by reference to Fig. 11 the folding side panels 53 and 55 are shorter than those of the front, the lower ends being sufficiently high to permit them to stand when finally adjusted for use as shown in Fig. 7, directly over the drain trough 14.

The operation of the folding cabinet and other parts is as follows: For ordinary use either of the lavatory or bowl 27, the cabinet may be permitted to remain compactly folded as shown in Fig. 4, when, upon opening the door 65, either of said parts may be unfolded and used. Should it be desirable to utilize said cabinet as an inclosure with either of the parts mentioned, it may be accomplished by merely extending it without lowering the platform, or when required for shower-bath purposes, it is first extended to its full limit so that the several panels are caused to assume the respective positions shown in Fig. 5, the platform 9 is lowered to a horizontal position as shown in Figs. 11 and 12, after which the front is pushed back and the side panels moved in laterally until the parts are caused to assume the respective positions shown in Fig. 7. Upon attaching a hose with a spray nozzle in the usual well known way to the faucet 30, the user may take a shower-bath while standing upon the platform 9. While thus utilized the drippings from the platform 9 flow into the trough 14 and thence upon the drip-board 4.

I do not wish to be confined to the specific construction described as it is obvious that it may be varied without departing from the principle involved. For example, it is manifest that the bowls 21 and 27 may be attached directly to a stationary support while the hinged platform may be omitted. Moreover, the flushing apparatus may be modified to conform to variations in cost and other conditions.

Having thus described my invention, what I claim and desire to secure by Letters-Patent is:—

1. In a device of the class described, the combination with a water discharge conduit of a pivoted bowl supporting element, mounted upon a horizontal axis, a bowl pivotally mounted upon a horizontal axis within said supporting element, means for admitting water to said bowl and means in positive connection with said bowl for tilting the same, and means for causing said tilting means after a limited movement, to engage said supporting means and tilt the two together.

2. In a device of the class described, the combination with a water discharge conduit, of a pivoted bowl supporting element mounted upon a horizontal axis, a bowl pivotally mounted upon a horizontal axis within said supporting element, means for admitting water to said bowl, means connected with said bowl and in position to engage said supporting element to tilt said bowl within said supporting element to a limited extent and then tilt the two in unison and means actuated by said tilting means for flushing said conduit.

3. In a device of the class described, the combination with a water discharge conduit, of a bowl supporting element comprising a casing pivotally mounted upon a horizontal axis, a bowl pivotally mounted upon a horizontal axis within said casing, means actuated by the downward movement of said casing for admitting water to said bowl and means connected with said bowl for first tilting the latter to a limited extent within said support and then tilting the two together.

4. In a device of the class described, the combination with a water discharge conduit of a bowl casing pivotally mounted upon a horizontal axis, a bowl pivotally mounted within said casing and having a limited movement therein independent of that of said casing, means for admitting water to said bowl when in a horizontal position, a handle attached to said bowl and means for causing said handle to engage said casing to tilt the same with said bowl after a limited tilting movement of the latter.

5. In a device of the class described, the combination with a discharge receptacle, of a pivotally mounted platform having one edge located above said receptacle, means for normally securing said platform in a vertical position, a fluid conduit mounted upon said platform with its final discharge in communication with said discharge receptacle, a tilting bowl mounted upon said platform in position to discharge into said conduit when said bowl is tilted to an upright position, a source of water supply and means for causing a flow of water from said conduit into said bowl when the latter is disposed horizontally.

6. In a device of the class described, the combination with a discharge receptacle, of a pivotally mounted platform having one edge located above said receptacle, means for normally securing said platform in a vertical position, a fluid conduit mounted upon said platform with its fluid discharge in communication with said discharge receptacle, a tilting bowl mounted upon said platform in position to discharge into said conduit when said bowl is tilted to an upright position, a source of water supply, a normally closed flush-valve in communication with said discharge receptacle and means for actuating said valve when said bowl is tilted to an upright position.

7. In a device of the class described, the combination of a discharge receptacle, a drain-board located above the same to drain therein, a pivotally mounted platform having one edge located above said drain-board, means for detachably securing said platform in a vertical position, a fluid conduit mounted upon said platform with its fluid discharge in communication with said discharge receptacle, a tilting bowl mounted upon said platform in position to discharge into said conduit when said bowl is tilted to an upright position, a source of water supply, a normally closed flush-valve in communication with said discharge receptacle and means for opening said valve when said bowl is tilted to an upright position.

8. In a device of the class described the combination with a discharge receptacle of a pivotally mounted platform having one edge located above said receptacle, means for normally securing said platform in a vertical position, a fluid conduit mounted upon said platform with its fluid discharge in communication with said discharge receptacle, a tilting bowl mounted upon said platform in position to discharge into said conduit when said bowl is tilted to an upright position, means for supplying water to said bowl and folding extensible walls arranged to inclose said platform when lowered to form a cabinet for the reception of said toilet features.

9. In a device of the class described, the combination of a discharge receptacle, a pivotally mounted platform having one edge located above said receptacle, means for normally securing said platform in a substantially vertical position, a source of water supply and means for draining from said platform when in a horizontal position into said discharge receptacle.

10. In a device of the class described, the combination of a discharge receptacle, a pivotally mounted platform located above said discharge receptacle, means for normally securing said platform in a substantially vertical position, a source of water supply, means for draining from said platform when in a horizontal position into said discharge receptacle and a folding extensible cabinet the walls of which are arranged to extend around the periphery of said platform when lowered and to be compactly folded against the same when raised.

11. In a device of the class described, the combination of a discharge receptacle, a pivotally mounted platform located above said discharge receptacle, means for normally securing said platform in a substantially vertical position, a fluid conduit mounted upon said platform, with its final discharge in communication with said discharge receptacle, a tilting bowl mounted upon said platform, a source of water supply and a folding extensible cabinet the walls of which are adapted to be folded against said platform when raised, the front wall of said cabinet being provided with a door opposite said tilting bowl to permit the latter to be lowered and utilized when said door is opened without extending said cabinet.

In testimony whereof, I have signed this specification in the presence of two subscribing witnesses, this 31st day of August 1910.

BURTON D. KNICKERBOCKER.

Witnesses:
DAVID H. FLETCHER,
JENNIE L. FISKE.